United States Patent [19]

Adam et al.

[11] Patent Number: 4,501,592
[45] Date of Patent: Feb. 26, 1985

[54] ANTHRAQUINONE DYES, PROCESS FOR THEIR PREPARATION, AND USE THEREOF

[75] Inventors: Jean-Marie Adam, Rosenau, France; Peter Bloch, Muttenz, Switzerland

[73] Assignee: Ciba-Geigy Corporation, Ardsley, N.Y.

[21] Appl. No.: 521,904

[22] Filed: Aug. 10, 1983

[30] Foreign Application Priority Data

Aug. 23, 1982 [CH] Switzerland .................. 5000/82

[51] Int. Cl.³ .................. C09B 1/34; D06P 1/40
[52] U.S. Cl. .................. 8/676; 8/679; 8/680; 8/696; 8/924; 260/371; 260/372; 260/374
[58] Field of Search .................. 260/374, 372, 371; 8/676, 679

[56] References Cited

U.S. PATENT DOCUMENTS

| | | | |
|---|---|---|---|
| 3,320,287 | 5/1967 | Schwander | 260/372 |
| 3,665,019 | 5/1972 | Singer | 260/374 |
| 4,188,187 | 2/1980 | Mislin et al. | 8/676 |
| 4,309,180 | 1/1982 | Lacroix et al. | 8/609 |

FOREIGN PATENT DOCUMENTS 1214194 12/1970 United Kingdom .
1553146 9/1979 United Kingdom .

Primary Examiner—A. Lionel Clingman
Attorney, Agent, or Firm—Edward McC. Roberts

[57] ABSTRACT

The invention relates to dyes of the formula

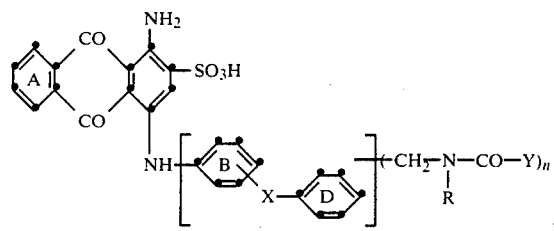

wherein X is oxygen or sulfur, R is hydrogen or $C_1$–$C_4$alkyl, Y is an unsubstituted or substituted aryl radical, n is 1, 2 or 3, the benzene ring A may be substituted by halogen and the benzene rings B and D may each independently be substituted by halogen, $C_1$–$C_4$alkyl, $C_1$–$C_4$alkoxy or a radical of the formula $-(O-CH_2CH_2)-O-R_1$, wherein $R_1$ is hydrogen, methyl or ethyl. These dyes are suitable for dyeing or printing natural or synthetic polyamide fibres.

15 Claims, No Drawings

ANTHRAQUINONE DYES, PROCESS FOR THEIR PREPARATION, AND USE THEREOF

The present invention relates to novel water-soluble anthraquinone dyes, to a process for the preparation thereof, and to the use of these dyes for dyeing or printing textile material, in particular natural and synthetic polyamide material.

Acid anthraquinone dyes have long been used for dyeing and printing textile fabrics, especially natural and synthetic polyamide fibres. However, many known acid anthraquinone dyes are of only limited use for dyeing and printing polyamide material, as these dyes often do not exhaust sufficiently well onto the fibres, so that it is only possible to obtain dyeings of at most average depth of shade in economic manner. However, many of these dyes no longer meet the present stringent requirements in respect of fastness properties, in particular wetfastness. There is therefore a need for improved anthraquinone dyes of the class specified above.

Accordingly, it is the object of the present invention to provide novel blue anthraquinone dyes which are particularly suitable for dyeing natural and synthetic polyamides from an aqueous bath, or for printing such materials, and which also have excellent exhaust and, in addition, improved wetfastness properties.

It has now been found that this object is accomplished with the novel water-soluble acid anthraquinone dyes defined hereinafter.

The present invention accordingly relates to dyes of the formula

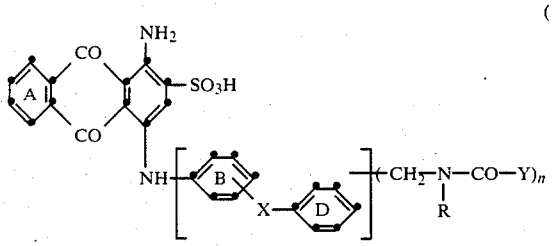

(1)

wherein X is oxygen or sulfur, R is hydrogen or $C_1$-$C_4$alkyl, Y is an unsubstituted or substituted aryl radical, n is 1, 2 or 3, the benzene ring A may be substituted by halogen and the benzene rings B and D may each independently be substituted by halogen, $C_1$-$C_4$alkyl, $C_1$-$C_4$alkoxy or a radical of the formula $-(O-CH_2CH_2)-O-R_1$, wherein $R_1$ is hydrogen, methyl or ethyl.

R as $C_1$-$C_4$alkyl may be methyl, ethyl, propyl, isopropyl, butyl, isobutyl, sec-butyl and tert-butyl.

The aryl radical Y may be a radical of the benzene or naphthalene series, a diphenyl radical, or the radical of a diphenyl ether, diphenylamine or diphenyl ketone. The aryl radical Y may be further substituted, e.g. by $C_1$-$C_4$alkyl groups such as methyl, ethyl, propyl, isopropyl, butyl, isobutyl, sec-butyl and tert-butyl; $C_1$-$C_4$alkoxy groups such as methoxy, ethoxy, propoxy, isopropoxy, butoxy, isobutoxy, sec-butoxy and tert-butoxy, phenoxy; or by $C_2$-$C_6$alkanoylamino groups such as acetamido or propionamido, benzoylamino; amino groups such as $-NH_2$, methylamino, ethylamino, dimethylamino, diethylamino, cyanoethylamino, hydroxyethylamino, dihydroxyethylamino, cyclohexylamino, benzylamino and phenylamino; by carboxylic acid esters groups such as carbomethoxy and carboethoxy; by trifluoromethyl, nitro, cyano, acetyl, methylsulfonyl, carbamoyl, sulfamoyl, ureido, hydroxy, carboxy, sulfo, sulfomethyl; and halogen such as fluorine, chlorine and bromine.

The dyes of the formula (1) may contain 1 to 3 aroylaminomethyl radicals. These radicals are attached to the benzene ring B and/or to the benzene ring D.

A suitable halogen substituent at the benzene ring A is fluorine, chlorine or bromine, which is preferably in the 6- or 7-position.

Possible substituents at the benzene rings B and D are: fluorine, chlorine, bromine, methyl, ethyl, propyl, isopropyl, butyl, isobutyl, sec-butyl, tert-butyl, methoxy, ethoxy, propoxy, isopropoxy, butoxy, isobutoxy, sec-butoxy, tert-butoxy, β-hydroxyethoxy, β-methoxyethoxy, β-(β'-methoxyethoxy)ethoxy and β-(β'-ethoxyethoxy)ethoxy.

Preferred dyes are:

(a) dyes of the formula (1), wherein Y is an unsubstituted or substituted phenyl, diphenyl or naphthyl radical;

(b) dyes according to (a), wherein X is oxygen, and Y is phenyl, diphenyl or naphthyl, each of which may be substituted by halogen, nitro, $C_1$-$C_4$alkyl or $C_1$-$C_4$alkoxy, the benzene ring A may be substituted by chlorine and the benzene rings B and D may each independently be substituted by halogen, $C_1$-$C_4$alkyl, $C_1$-$C_4$alkoxy or a radical of the formula $-(O-CH_2CH_2)-O-R_1$, wherein $R_1$ is hydrogen, methyl or ethyl;

(c) dyes according to (b), wherein Y is phenyl which may be substituted by chlorine, nitro or $C_1$-$C_4$alkyl, or is diphenyl or naphthyl, the benzene rings A and B are unsubstituted, and the benzene ring D may be substituted by $C_1$-$C_4$alkyl;

(d) dyes according to (b) or (c), wherein n is 1;

(e) dyes according to (d) of the formula

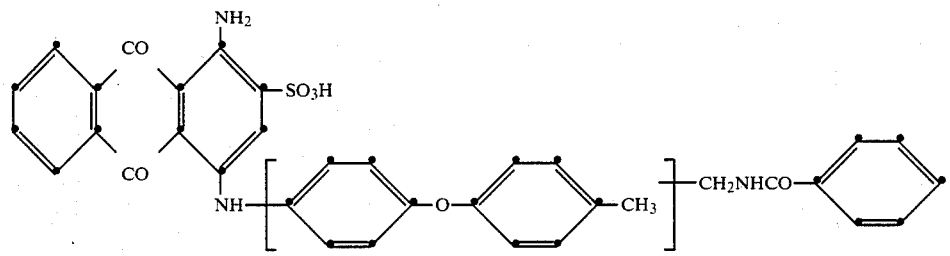

(2)

(f) dyes according to (b) or (c), wherein n is 2 or 3;
(g) dyes according to (f) of the formula

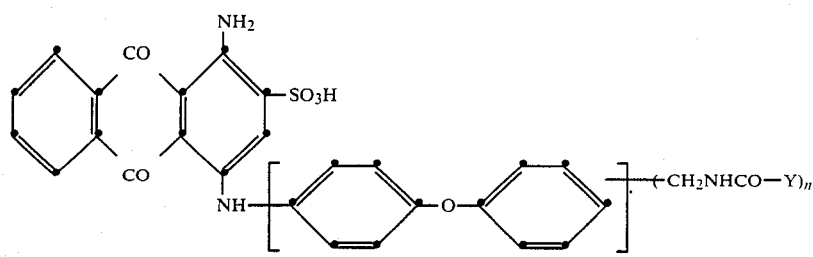

(3)

wherein Y is phenyl, chlorophenyl, dichlorophenyl, nitrophenyl, dimethylphenyl, tert-butylphenyl, diphenyl or 2-naphthyl, and n is as defined in (f);

(h) dyes according to (g) of the formula

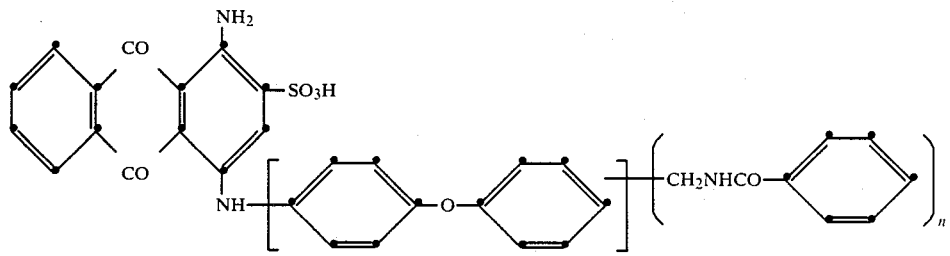

(4)

wherein n is 2 or 3.

The dyes of the formula (1) are obtained by reacting an anthraquinone compound of the formula

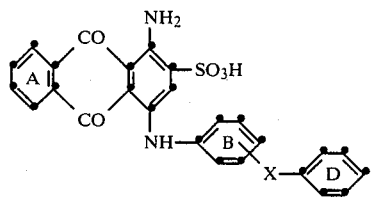

(5)

with n mole of a compound which introduces the radical of the formula

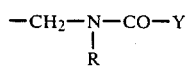

(6)

As compound which introduces the radical of the formula (6), it is preferred to use an N-methylolamide of the formula

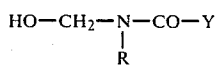

(7)

or a functional derivative of a compound which contains methylol groups and reacts in the same manner.

The reaction of the anthraquinone compound of the formula (5) with the compound which introduces the radical of the formula (6) is carried out such that at least one radical of the formula (6) is introduced. The dyes of the formula (1) may, in accordance with their definition, also contain two or three radicals of the formula (6). These radicals may be attached to the benzene ring B and/or D. Accordingly, two or three radicals of the formula (6) may also be attached to only one of the benzene rings B or, preferably, D. How many radicals of the formula (6) are introduced into the anthraquinone compound of the formula (5) when reating the anthraquinone compound of the formula (5) with the N-methylol compound or a reactive derivative thereof, and in what positions, depends in particular on the nature of the substituents attached to the benzene rings B and D. The condition is that the benzene rings B and D contain at least one replaceable hydrogen atom so as to be able to react with the N-methylol compound. The number of radicals of the formula (6) introduced can also often be influenced or determined by the choice of appropriate reaction conditions. The more nucleophilic the benzene rings B and D are under the reaction conditions, the more readily the condensation with the N-methylol compound proceeds and the better the yields and more homogeneous the condensation products obtained.

The starting anthraquinones of the formula (5) can be prepared in known manner by condensing 1-amino-4-bromoanthraquinone-2-sulfonic acid with corresponding aminodiphenyl ethers or thioethers.

Representative examples of suitable aminodiphenyl ethers or thioethers are: 4-amino-diphenyl ether(p-aminodiphenyl ether), 4-amino-4'-methyldiphenyl ether, 4-amino-4'-chlorodiphenyl ether, 4-amino-3-methoxydiphenyl ether, 3-aminodiphenyl ether(m-aminodiphenyl ether), 4-amino-3,5-dimethyldiphenyl ether, 4-amino-3,4',5-trimethyldiphenyl ether, 2-amino-3-methyldiphenyl ether, 2-amino-3,5-dimethyldiphenyl ether, 2-amino-4-chlorodiphenyl ether, 4-amino-4'-tert-butyldiphenyl ether, 4-aminodiphenyl thioether, 4-amino-4'-ethyldiphenyl ether, 4-amino-4'-isopropyldiphenyl ether, 4-amino-4'-neopentyldiphenyl ether. 4-amino-4'-methyldiphenyl thioether, 4-amino-4'-chlorodiphenyl thioether, 4-amino-2'-methyldiphenyl ether, 4-amino-3-methyldiphenyl ether.

The aroyl-N-methylolamides suitable for use as second reactant are obtained by addition of formaldehyde to the corresponding aromatic monocarboxamides using basic condensing agents, for example potassium carbonate, or also by treatment with a mineral acid under mild conditions. Suitable aromatic monocarboxamides are primary amides of monocyclic or polycyclic monocarboxylic acids, for example those of benzene.

naphthalene, diphenyl, diphenyl ether, diphenylamine or diphenylketone monocarboxylic acids. Mixtures of carboxamides can also be used, for example the amides of mixtures of aromatic monocarboxylic acids which are obtained by oxidation of a mixture of benzene homologues or of a mixture of halogenated toluenes, or by the chlorination of benzoyl chloride.

Typical examples of N-methylolamides of the formula (7) are: N-methylolbenzamide, N-methylol-2,4-dichlorobenzamide, N-methylol-(4-tert-butyl)benzamide, N-methylol-2-chlorobenzamide, N-methylol-4-chlorobenzamide, N-methylol-4-nitrobenzamide, N-methylol-2-nitrobenzamide, N-methylol-2-bromobenzamide, N-methylol-2,4-dibromobenzamide, N-methylol-2,4-dimethylbenzamide, N-methylol-3,4-dimethylbenzamide, N-methylol-3-bromobenzamide, N-methylol-4-methylbenzamide, N-methylol-3-methylbenzamide, N-methylol-2-methylbenzamide, N-methylol-3-nitrobenzamide, N-methylol-N-methylbenzamide, N-methyloldiphenylcarboxamide, N-methylol-naphthalene-2-carboxamide, N-methylol-dichlorobenzamide, obtained from a technical dichlorobenzoic acid which has been prepared by chlorination and oxidation of toluene and which consists, besides trichlorobenzoic acid, substantially of 2,4- and 2,6-dichlorobenzoic acid.

It is preferred to use the N-methylol compound of a benzene monocarboxamide for the process of this invention. It is most preferred to use N-methylolbenzamide.

The condensation of the anthraquinone compounds of the formula (5) with the compound which introduces the radical of the formula (6), e.g. the N-methylolamide of the formula (7), is conveniently carried out in acid medium, e.g. in the presence of an acid condensing agent or of a compound which splits off water and acts like a condensing agent. Examples of such condensing agents are concentrated hydrochloric acid, zinc chloride, phosphorus pentoxide, acetic anhydride, polyphosphoric acid and oleum. The preferred condensing agent is 80% to anhydrous sulfuric acid, preferably 90% sulfuric acid, as this can normally be used simultaneously as solvent for the reactants. The reaction temperature may vary within wide limits and depends in particular on the condensing agent employed. In concentrated sulfuric acid the reaction proceeds rapidly and goes to completion even at about 0° C.; but room temperature (20°–25° C.) is preferred. In some cases it is necessary to carry out the reaction at slightly elevated temperature, e.g. up to 60° C., especially whenever it is desired to introduce several aroylaminomethyl groups. The reaction products are precipitated e.g. by pouring their solutions or suspensions in sulfuric acid into ice-/water and converting them in conventional manner into the water-soluble alkali metal salts, preferably into the sodium salts, which are then isolated.

Instead of using the aroyl N-methylolamides, it is also possible to use reactive functional derivatives of these compounds, provided they react in the same manner. Examples of suitable reactive functional derivatives are the esters obtainable by treating the methylol compounds with inorganic or organic acids or acid halides or anhydrides. Particularly preferred reactive functional derivatives of the N-methylolamides of the formula (7) are the reactive esters of these compounds with strong acids such as N-(chloromethyl)amides or N-(bromomethyl)amides. These esters are obtained e.g. by treating the methylolamides with thionyl chloride or thionyl bromide. Other suitable reactive derivatives of the N-methylolamides of the formula (7) are e.g. the di(aroylamidomethyl)ethers obtainable from these methylol compounds by self-condensation, in the presence of e.g. phosphoroxy chloride. However, as these reactive functional derivatives usually have to be prepared from the corresponding methylol compounds, it is generally preferred to use these latter as reactants. However, in individual cases in which unsatisfactory results are obtained with the methylol compounds, it is possible to attain the desired objective with these derivatives, especially with the N-chloromethylamides. In some cases the process can be successfully simplified by reacting, instead of the pure N-methylolamide, a mixture of the anthraquinone compound of the formula (5) with formaldehyde or a polymer thereof and the aroylamide in a continuous process, without isolation of the intermediate.

Instead of the N-methylolamide of the formula (7) or a reactive functional derivative thereof, it is in some cases possible to react a reaction product of α,α'-dihalodimethyl ether, e.g. α,α'-dichloro- or α,α'-dibromodimethyl ether, with the amides of the formula

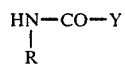

$$\begin{array}{c} HN-CO-Y \\ | \\ R \end{array} \qquad (8)$$

or, in some cases also with the nitriles of the formula

$$N \equiv C - Y \qquad (9)$$

(which are saponified under the reaction conditions to the above amides), such as acetonitrile, propionitrile or benzonitrile, in sulfuric acid. It is advantageous to carry out the process in concentrated (90 to 100%) sulfuric acid.

Examples of suitable nitriles or aroylamides for this process variant are: benzonitrile, 2-chlorobenzonitrile, 4-chlorobenzonitrile, 2,4-dichlorobenzonitrile, 3-bromobenzonitrile, 3-nitro-4-methylbenzamide, benzamide and 4-(tert-butyl)benzamide.

A modified process for obtaining the dyes of the formula (1) comprises synthesising the anthraquinone compounds from precursors, one of which already contains at least one radical of the formula (6). This is done by condensing e.g. 1-amino-4-bromoanthraquinone-2-sulfonic acid with an aminodiphenyl ether which contains a radical of the formula (6) as substituent, by methods which are known per se.

The dyes of the formula (1) are novel. They are suitable in particular for dyeing and printing fibre material which contains polypeptide groups e.g. synthetic polyamides, polyurethanes, wool, silk, and leather. The dyes exhaust very levelly onto these materials from an acid aqueous bath. Even in weakly acid to neutral aqueous solution, they have excellent affinity for the nitrogen-containing fibres specified above and therefore have a very good exhaustion capacity.

The dyes exhaust very well onto synthetic polyamide fibres from a neutral to weakly acid bath and give level, brilliant blue dyeings. They are also suitable for dyeing by the HT process.

The dyeings obtained on synthetic polyamide fibres have good lightfastness and good wetfastness properties such as fastness to water, washing and perspiration. In admixture with other acid dyes, the dyes of this invention are also suitable for producing combination dyeings.

Compared with the closest comparable known acid anthraquinones of German patent specification Nos. 1 189 669 and 1 810 156, which contain a phenylamino radical instead of the radical of an aminodiphenyl ether in the 4-postion of the anthraquinone nucleus, and which contain a halogen atom instead of a sulfo group in the 2-position of the anthraquinone nucleus and are also sulfonated in the radical of an aminodiphenyl ether in the 4-position of the anthraquinone nucleus, the dyes of the formula (1) surprisingly have a substantially better affinity for synthetic polyamide fibres, better migration properties, faster penetration and often also better wetfastness properties.

The invention is illustrated by the following Examples in which parts are by weight, unless otherwise indicated. The relationship between parts by weight and parts by volume is the same as that between the gram and the cubic centimeter. Percentages are by weight.

EXAMPLE 1

51 parts of the compound of the formula

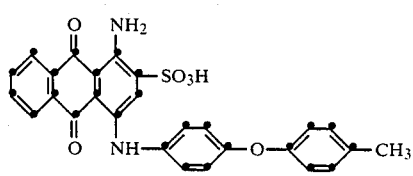

(obtained by condensing 1 mole of 1-amino-4-bromoanthraquinone-2-sulfonic acid with 1 mole of 4-amino-4'-methyl-diphenyl ether) are mixed with 15 parts of N-methylolbenzamide and the mixture is added at 0°–5° C. to 300 parts of 90% sulfuric acid. The mixture is stirred for 20 hours at 5° C. and then poured onto ice. The precipitated dye of the formula

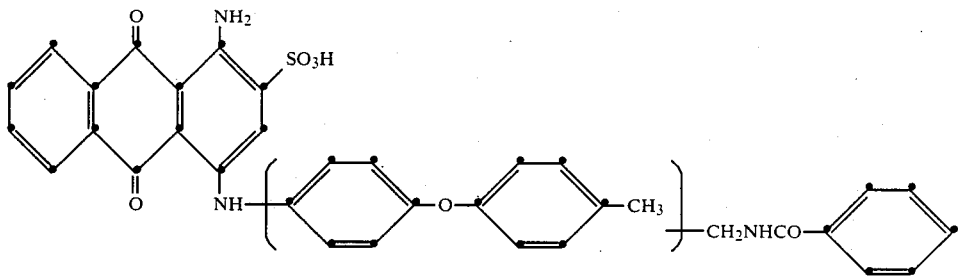

is isolated by filtration, washed until neutral and dried. The sodium salt dyes polyamide fibres in blue shades with good exhaustion of the dye and good wetfastness properties.

EXAMPLE 2

A mixture of 50 parts of the sodium salt of the dye of the formula

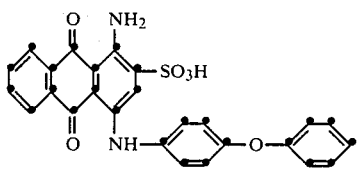

(obtained by condensing 1 mole of 1-amino-4-bromoanthraquinone-2-sulfonic acid with 1 mole of 4-aminodiphenyl ether) and 30 parts of N-methylolbenzamide is added at 0°–5° C. to 300 parts of 90% sulfuric acid. The mixture is then stirred for 20 hours at 0°–5° C. The solution is poured onto ice and the precipitated dye of the formula

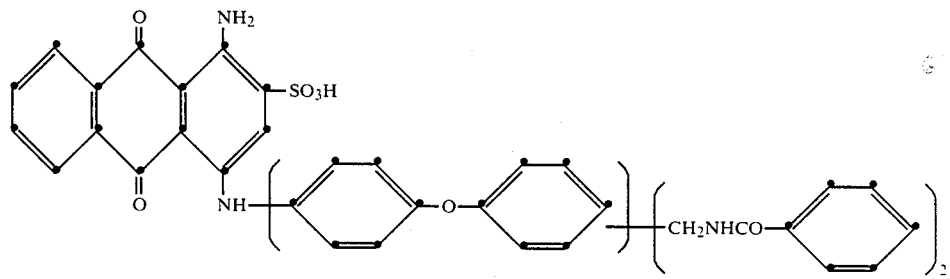

is isolated by filtration, washed until neutral and dried. The sodium salt dyes polyamide fibres in blue shades with very good exhaustion of the dye and good wetfastness properties.

The dye of the formula

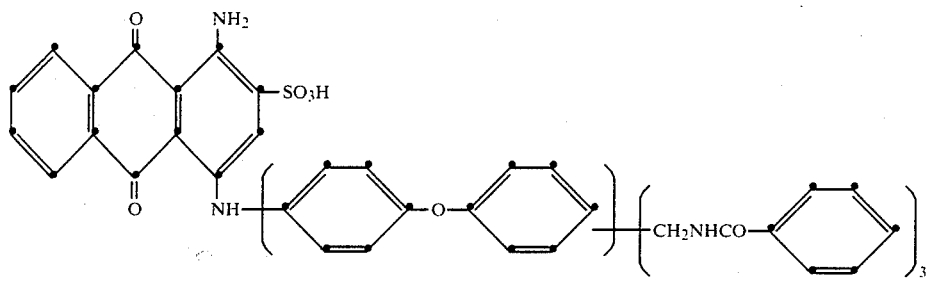

is obtained by using 45 parts instead of 30 parts of N-methylolbenzamide and repeating the above procedure.

Dyes having similar properties are obtained by repeating the procedure of this Example and using, instead of the indicated methylol compound, equivalent parts of N-methylol-2-chlorobenzamide, N-methylol-4-chlorobenzamide, N-methylol-4-tert-butylbenzamide, N-methylol-2-nitrobenzamide, N-methylol-2,4-dichlorobenzamide, N-methylol-3,4-dimethylbenzamide, N-methylol-diphenylcarboxamide or N-methylol-naphthalene-2-carboxamide.

EXAMPLE 3

A dyebath is prepared from 4000 parts of water, 4 parts of ammonium acetate, 2 parts of the dye of Example 1, and acetic acid in an amount such that the bath has a pH of 6. Into this bath are then put 100 parts of synthetic polyamide tricot fabric. The bath is heated to the boil over half an hour and dyeing is performed for 45 minutes at 100° C. A blue dyeing with good exhaustion of the dye is obtained.

EXAMPLE 4

5 parts of the dye of Example 2 are made into a paste with 50 parts of boiling water and this paste is dissolved in 350 parts of boiling water. The solution is stirred into 500 parts of a thickener (guar derivative). Then 3 parts of a levelling agent and 1.5 parts of an antifoam are stirred in, the weight is adjusted to 1000 parts with water, and the solution is acidified to pH 3.5 with acetic acid. The printing paste so obtained is applied to polyamide carpeting by any printing method. The prints are dried and then fixed in a steamer for 2 minutes at 101° C. with saturated steam. The fixed prints are first washed cold, then warm, and subsequently rinsed lukewarm and cold. The wash-water is colourless.

What is claimed is:

1. A dye of the formula

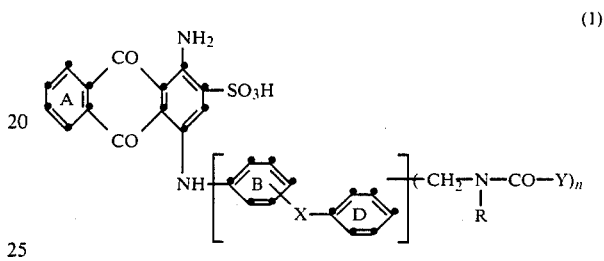

wherein X is oxygen or sulfur, R is hydrogen or $C_1$-$C_4$alkyl, Y is an unsubstituted or substituted aryl radical, n is 1, 2 or 3, the benzene ring A may be substituted by halogen and the benzene rings B and D may each independently be substituted by halogen, $C_1$-$C_4$alkyl, $C_1$-$C_4$alkoxy or a radical of the formula $-(O-CH_2CH_2)-O-R_1$, wherein $R_1$ is hydrogen, methyl or ethyl.

2. A dye according to claim 1, wherein Y is an unsubstituted or substituted phenyl, diphenyl or naphthyl radical.

3. A dye according to claim 2, wherein X is oxygen, and Y is phenyl, diphenyl or naphthyl, each of which may be substituted by halogen, nitro, $C_1$-$C_4$alkyl or $C_1$-$C_4$alkoxy, the benzene ring A may be substituted by chlorine and the benzene rings B and D may each independently be substituted by halogen, $C_1$-$C_4$alkyl, $C_1$-$C_4$alkoxy or a radical of the formula $-(O-CH_2CH_2)-O-R_1$, wherein $R_1$ is hydrogen, methyl or ethyl.

4. A dye according to claim 3, wherein Y is phenyl which may be substituted by chlorine, nitro or $C_1$-$C_4$alkyl, or is diphenyl or naphthyl, the benzene rings A and B are unsubstituted, and the benzene ring D may be substituted by $C_1$-$C_4$alkyl.

5. A dye according to either claim 3 or claim 4, wherein n is 1.

6. A dye according to claim 5, of the formula

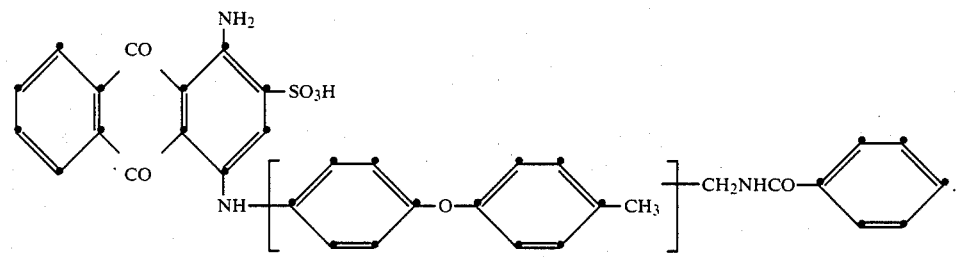

7. A dye according to either claim 3 or claim 4, wherein n is 2 or 3.

8. A dye according to claim 7, of the formula

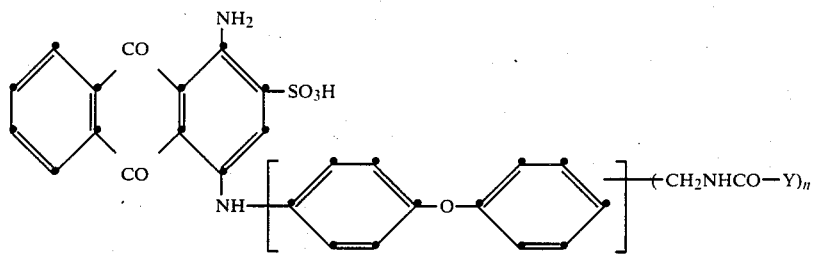

wherein Y is phenyl, chlorophenyl, dichlorophenyl, nitrophenyl, dimethylphenyl, tert-butylphenyl, diphenyl or 2-naphthyl, and n is as defined in claim 7.

9. A dye according to claim 8, of the formula

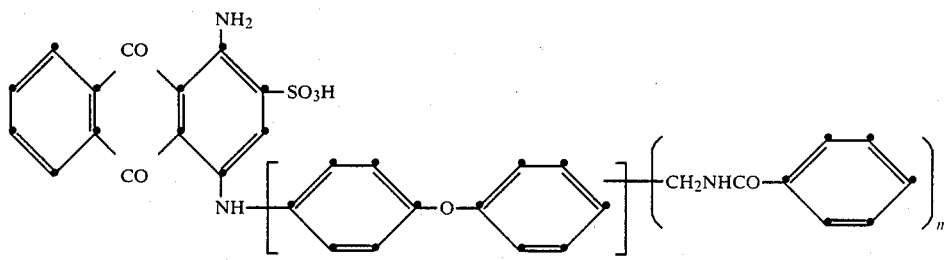

wherein n is 2 or 3.

10. A process for the preparation of a dye according to claim 1, which comprises reacting an anthraquinone compound of the formula

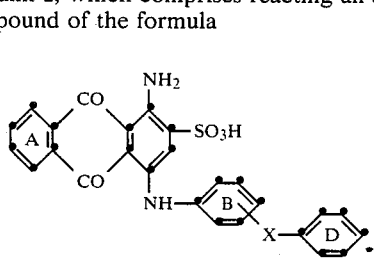

with n mole of a compound which introduces the radical of the formula

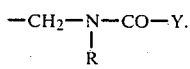

11. A process according to claim 10, wherein the compound which introduces the radical of the formula (6) is an N-methylolamide of the formula

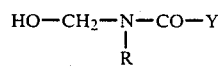

or a reactive functional derivative of a compound which contains methylol groups.

12. A process according to claim 11, which comprises the use of the N-methylol compound of a benzene monocarboxamide.

13. A process according to claim 12, which comprises the use of N-methylolbenzamide.

14. A process for dyeing or printing a polyamide substrate comprising the step of applying to the substrate a dye of the formula

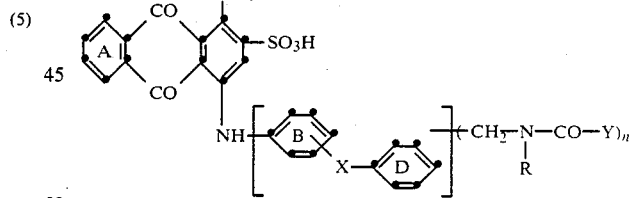

wherein X is oxygen or sulfur, R is hydrogen or $C_1$-$C_4$alkyl, Y is an unsubstituted or substituted aryl radical, n is 1, 2 or 3, the benzene ring A may be substituted by halogen and the benzene rings B and D may each independently be substituted by halogen, $C_1$-$C_4$alkyl, $C_1$-$C_4$alkoxy or a radical of the formula (O—$CH_2CH_2$)O—$R_1$, wherein $R_1$ is hydrogen, methyl or ethyl.

15. The process of claim 14 wherein the dye is applied to the substrate by printing.

* * * * *